United States Patent
Patrascu et al.

(10) Patent No.: US 9,309,928 B2
(45) Date of Patent: Apr. 12, 2016

(54) YOKE WITH STIFFNESS RING

(75) Inventors: Dumitru Florin Patrascu, West Bloomfield, MI (US); Christopher Steele, Lake Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1225 days.

(21) Appl. No.: 12/850,070

(22) Filed: Aug. 4, 2010

(65) Prior Publication Data

US 2012/0034983 A1 Feb. 9, 2012

(51) Int. Cl.
*F16D 3/38* (2006.01)

(52) U.S. Cl.
CPC ..................................... *F16D 3/387* (2013.01)

(58) Field of Classification Search
USPC ........... 464/117–119, 134–136; 403/235, 236
See application file for complete search history.

(56) References Cited

U.S. PATENT DOCUMENTS

| | | | |
|---|---|---|---|
| 1,324,898 A * | 12/1919 | Hopcraft | 464/119 X |
| 4,915,536 A * | 4/1990 | Bear | F16D 1/068 |
| 5,562,546 A | 10/1996 | Koslowski et al. | |
| 5,735,747 A | 4/1998 | Gehrke et al. | |
| 5,868,626 A | 2/1999 | Whitney | |
| 5,951,402 A | 9/1999 | Baldwin et al. | |
| 6,257,986 B1 | 7/2001 | Duggan et al. | |
| 6,328,654 B1 | 12/2001 | Brissette et al. | |
| 6,454,656 B2 | 9/2002 | Brissette et al. | |
| 6,490,540 B1 | 12/2002 | Kurzeja et al. | |
| 6,761,237 B2 | 7/2004 | Brissette et al. | |
| 6,860,815 B2 | 3/2005 | Brissette | |
| 6,899,630 B2 * | 5/2005 | Fisher et al. | 464/134 X |
| 7,029,398 B1 * | 4/2006 | Burnard | 464/134 |
| 2003/0004001 A1 | 1/2003 | Bell et al. | |
| 2003/0050126 A1 | 3/2003 | Arnold | |
| 2008/0096677 A1 | 4/2008 | Kurzeja et al. | |
| 2009/0242315 A1 | 10/2009 | Shibahiraki et al. | |
| 2011/0011206 A1 | 1/2011 | Knight et al. | |

FOREIGN PATENT DOCUMENTS

| | | |
|---|---|---|
| BE | 459417 | 8/1945 |
| EP | 1437253 A2 | 7/2004 |
| EP | 1972542 A1 | 9/2008 |
| JP | 10299787 A | 11/1998 |

OTHER PUBLICATIONS

Wagner et al, "Driveshaft Attachment Methods," Universal Joint and Driveshaft Design Manual, AE-7, Society of Automotive Engineers, Inc., Warrendale, PA, pp. 209-211, TJ1079.S62 1979.*
EP Search Report dated Jan. 20, 2012.

* cited by examiner

*Primary Examiner* — G. Binda
(74) *Attorney, Agent, or Firm* — Brooks Kushman P.C.

(57) ABSTRACT

A yoke includes a body having a pair of yoke arms that are adapted to receive a cross member of a universal joint. The body includes a stiffness ring extending radially outwardly from an outer periphery of the body at least in regions of each of the yoke arms.

24 Claims, 4 Drawing Sheets

YOKE WITH STIFFNESS RING

TECHNICAL FIELD

This invention generally relates to a driveline yoke with a stiffness ring that more evenly distributes load forces.

BACKGROUND OF THE INVENTION

Vehicle drivelines typically include a series of driveshafts that are connected to each other at connection interfaces. Various connection interfaces can be used to connect these driveshafts, such as flanges or universal joint yokes for example. Flanges and universal joint yokes each include a hub portion with a bore that receives one end of a driveshaft. A flange includes a substantially flat connection interface that connects to another flange component. A yoke is connected to another yoke with a cross member to form a universal joint. The cross member includes four trunnions. One yoke includes a pair of yoke arms that are coupled to two trunnions of the cross member. The remaining pair of trunnions are coupled to another pair of yoke arms on a second yoke to form the universal joint.

One advantage with a flange connection is that torque loads are evenly distributed across the body of the flange such that torque levels are at an acceptable level when they reach a reduced diameter area at the hub portion. When a flange connection is replaced by a universal joint yoke, due to the opposing connection point interfaces of the yoke arms, stress levels are significantly increased at the hub portion, which can result in premature wear or failure.

SUMMARY OF THE INVENTION

A driveline yoke includes a body with a pair of yoke arms that are adapted to receive a cross member. The body includes a stiffness ring that comprises an increased diameter portion that extends radially outwardly from the body at least in regions of the yoke arms.

In one example, the increased diameter portion extends about a substantial portion of an outer periphery of the body. In another example, the increased diameter portion extends entirely about the outer periphery of the body.

The body includes a hub portion on one side and the yoke arms extend outwardly from the body on an opposite side. The hub portion receives one end of a driveshaft that is rotatable about an axis. The increased diameter portion extends radially outwardly from the body at least in regions of each of the arms such that the arms are located radially closer to the axis than an outer peripheral edge of the increased diameter portion.

These and other features of the present invention can be best understood from the following specification and drawings, the following of which is a brief description.

DETAILED DESCRIPTION OF THE PREFERRED EMBODIMENT

Figure 1:
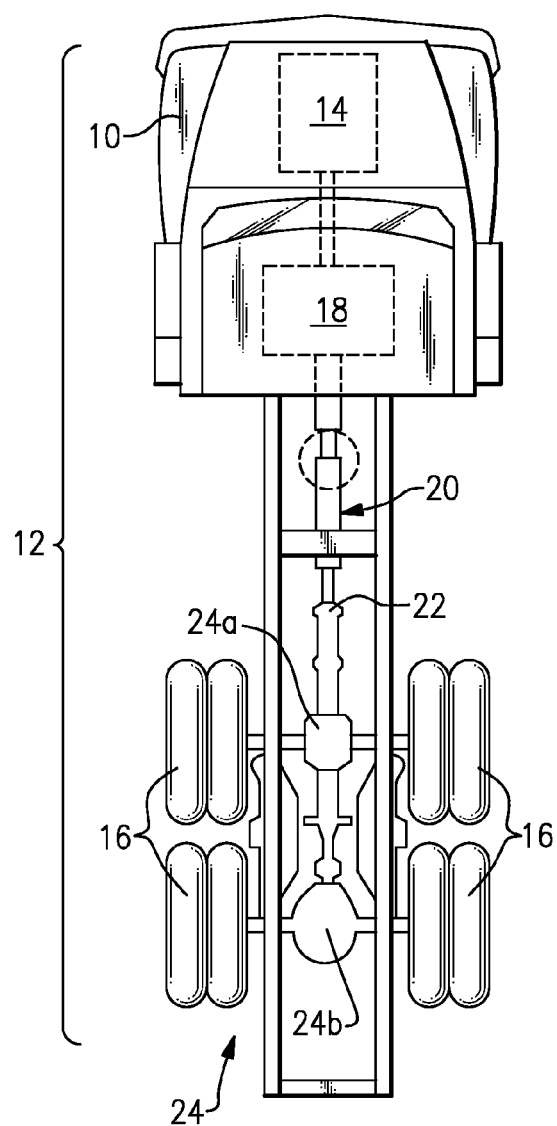
FIG. 1 is an overhead schematic view of driveline for a heavy-duty vehicle.

A heavy-duty vehicle 10 includes a powertrain assembly, shown generally at 12, that transfers driving power from a vehicle power source 14 to a plurality of wheels 16. The power source 14 can comprise an engine or electric motor, for example, and can be operably coupled to a transmission 18 in a known manner. A driveline assembly 20, including at least one driveshaft 22, is used to transfer driving power from the transmission 18 to a drive axle assembly 24 that supports the wheels 16. In the example shown, the drive axle assembly 24 is a tandem drive axle; however, other types of axles could also be utilized. The tandem drive axle includes a forward-rear axle 24a and a rear-rear axle 24b that are interconnected to each other.

Figure 2:
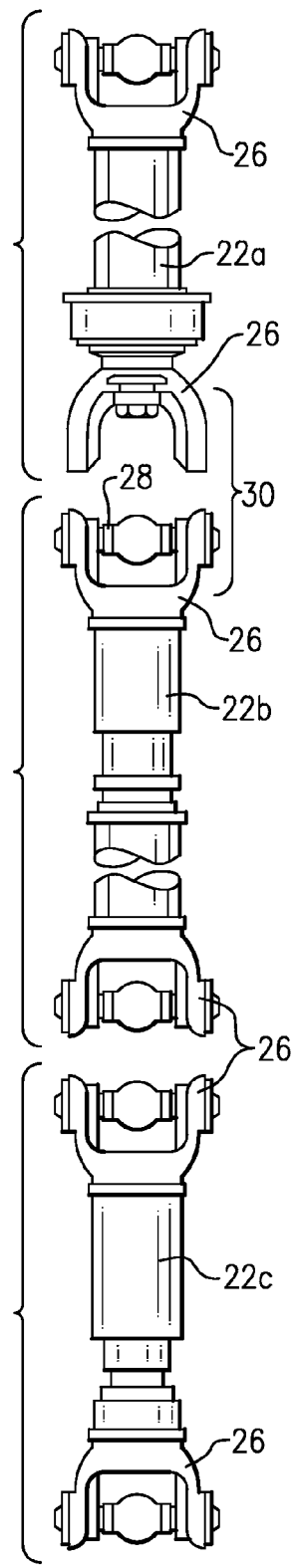
FIG. 2 is a magnified exploded view of a portion of the driveline from FIG. 1 showing a plurality of yokes.

FIG. 2 shows a typical driveshaft arrangement that includes a first driveshaft 22a connected to the transmission 18 at one end and connected to a second driveshaft 22b at an opposite end. The second driveshaft 22b is connected to the drive axle assembly 24 at an end opposite from connection to the first driveshaft 22a. A third driveshaft 22c is used to interconnect the forward-rear axle 24a to the rear-rear axle 24b. A yoke 26 is supported on each end of the driveshafts 22a, 22b, 22c. A cross member 28 is used to interconnect adjoining yokes 26. One cross member 28, coupled to two (2) yokes 26, defines a universal joint assembly (U-joint) 30.

U-joints allow two adjoining driveline components to be positioned at different angles relative to each other to accommodate relative movement and angular misalignment. Misalignment and relative movement can be caused by adjoining driveline components not being mounted within a common plane, or can be caused by a driveline component, such as a drive axle assembly 24, moving relative to adjoining driveline component, such as a driveshaft 22, in response to interaction with a vehicle suspension.

Figure 3:
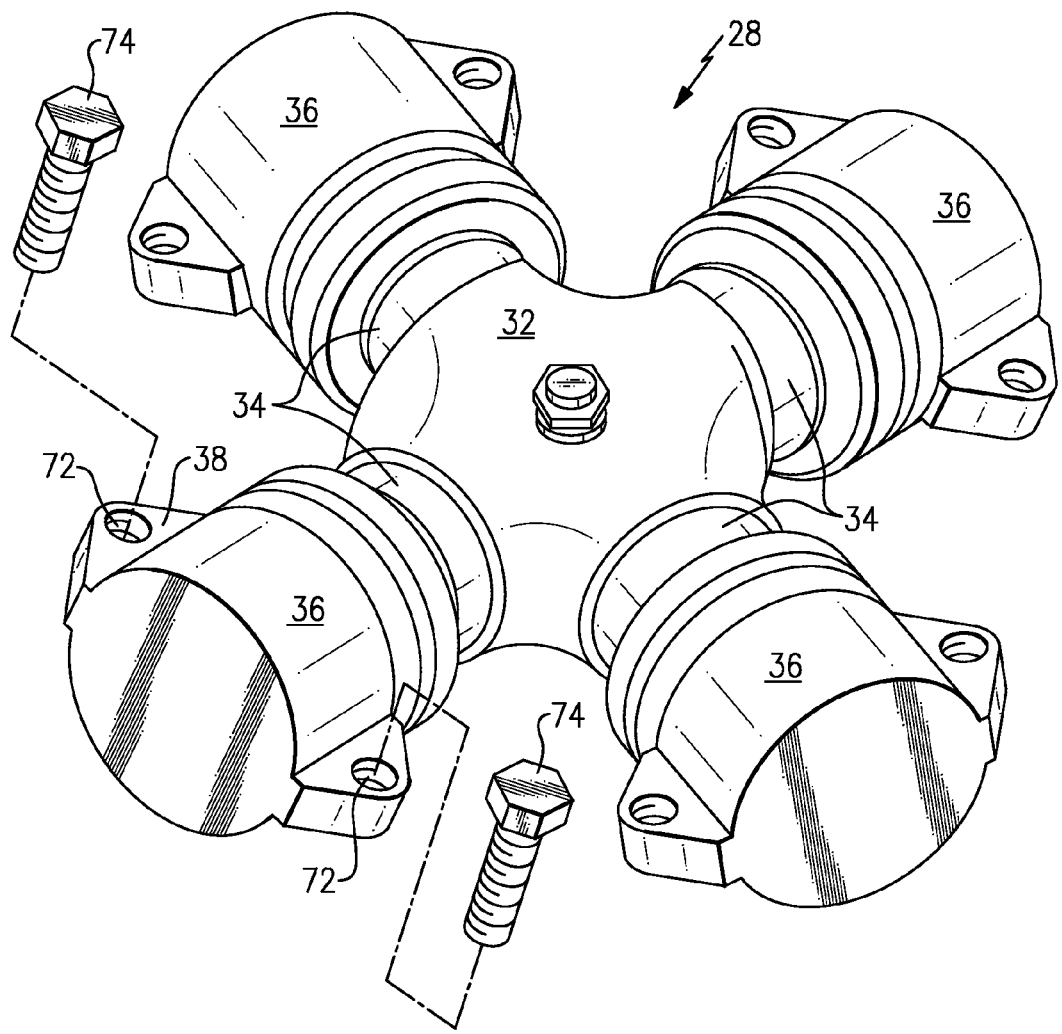
FIG. 3 is a perspective view of a universal joint cross member.

The cross member 28 is shown in greater detail in FIG. 3. The cross member 28 includes a central body portion 32 with a plurality of trunnions 34 extending out radially from the central body portion 32. Each yoke 26 is attached to a pair of trunnions 34. Bearing packs or needle cups 36 are installed over each trunnion 34. The needle cups 36 include a mounting interface 38 that attaches to the yoke 26.

The yoke 26 is shown in greater detail in FIGS. 4-8. The yoke 26 includes a body 40 rotatable about an axis A (FIG. 5), and which includes first 42 and second 44 opposing end faces. A hub portion 46 extends outwardly from the first opposing end face 42 and first 48 and second 50 yoke arms extend outwardly from the second opposing end face 44. A stiffness ring 52 extends radially outwardly from an outer periphery of the body 40 at least in regions of each of the first 48 and second 50 yoke arms such that the first 48 and second 50 yoke arms are located radially closer to the axis A than an outer peripheral edge 54 of the stiffness ring 52.

Figure 5:
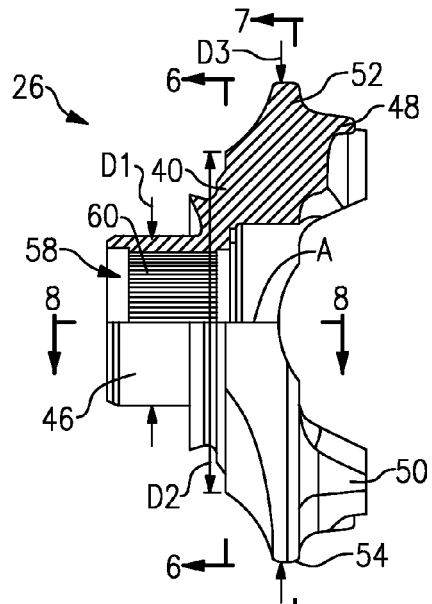
FIG. 5 is a side view in partial cross-section of the yoke of FIG. 4.
Figure 6:
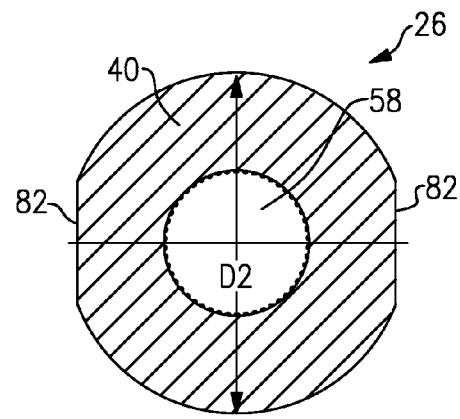
FIG. 6 is a cross-section taken along lines 6-6 as indicated in FIG. 5.
Figure 7:
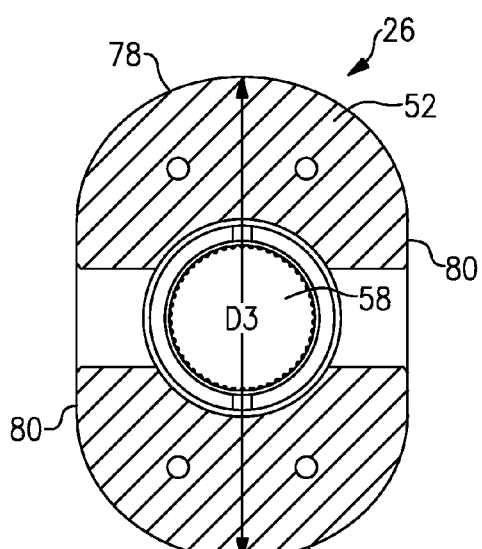
FIG. 7 is a cross-section taken along lines 7-7 as indicated in FIG. 5.

The hub portion 46 is defined by a first outer diameter D1 as shown in FIG. 5. The body 40 is defined by a second outer diameter D2 that is greater than the first outer diameter as shown in FIG. 6. The stiffness ring 52 is defined by a third outer diameter D3 that is greater than the second outer diameter D2 as shown in FIG. 7. The stiffness ring 52 comprises an increased diameter portion that transitions from an outer periphery of the body 40 to an outermost peripheral edge 54 of the ring 52 as shown in FIG. 5.

Figure 8:
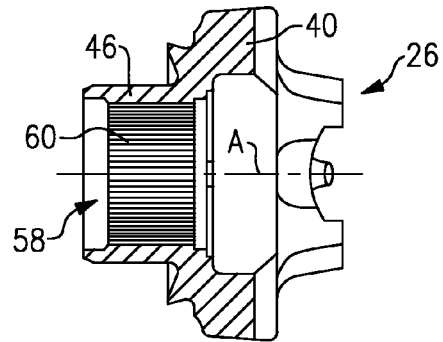
FIG. 8 is a cross-section taken along lines 8-8 as indicated in FIG. 5.

The hub portion 46 includes a bore 58 that includes a splined surface 60 as shown in FIG. 8. The bore 58 receives one end of the driveshaft 22 at a spline connection interface.

Figure 4:
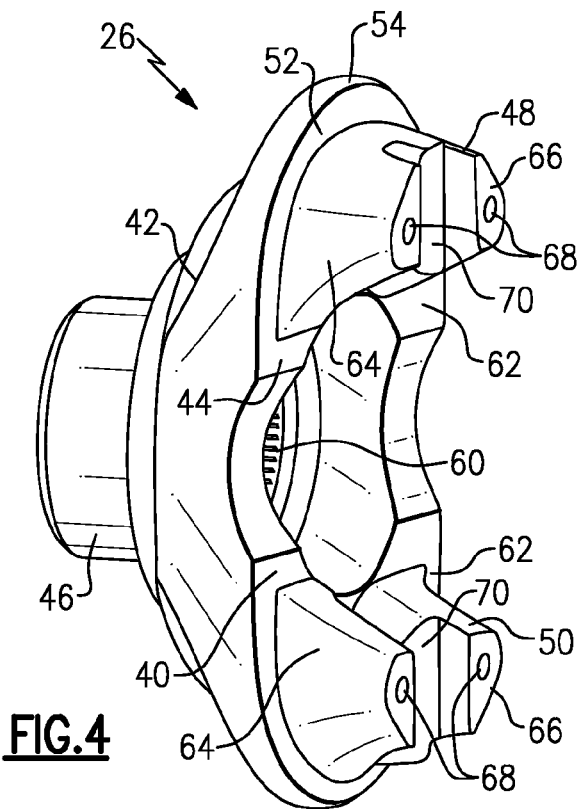
FIG. 4 is a perspective view of one yoke incorporating the subject invention.

The body 40 includes a generally flat surface area 62 in regions near the first 48 and second 50 yokes arms as shown in FIG. 4. Each of the first 48 and second 50 yoke arms includes a base 64 that extends to a distal end 66. The bases 64 have a larger cross-sectional area than the distal ends 66 such that the first 48 and second 50 yoke arms have a decreasing cross-sectional area in a direction extending to the distal ends 66. The bases 64 extend outwardly from the flat areas 62 of the body 40.

The distal ends 66 comprise a generally flat surface that includes a pair of fastening holes 68. Between the fastening holes 68, the distal ends 66 each include a recessed area 70 that is to receive one trunnion 34 of the cross member 28 (FIG. 3). As discussed above, the trunnions 34 include needle cups 36 with a mounting interface 38. The mounting interface 38 includes fastening holes 72 that are aligned with fastening holes 68 in the yoke arms 48, 50. Fasteners 74 are then inserted through the aligned holes to secure the cross member 28 to the yoke 26.

The stiffness ring 52 comprises an increased diameter portion that is integrally formed as part of the body 40, i.e. the body 40 and stiffness ring 52 comprise a monolithic structure. This allows torque to be more evenly distributed throughout the body before reaching the reduced diameter area at the hub portion 46. Analysis indicates that the use of the stiffness ring reduces torque levels at the hub portion of the yoke by 50% compared to a traditional yoke without the stiffness ring.

Figure 9:
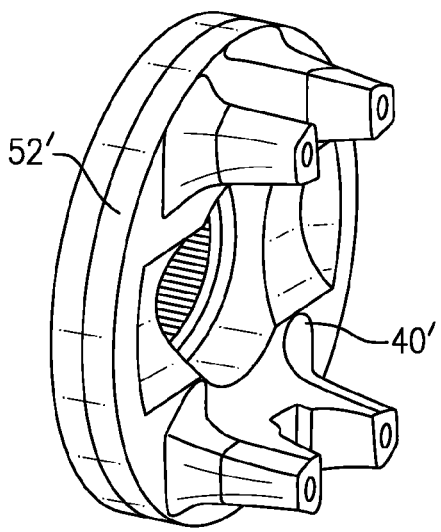
FIG. 9 is a perspective view of another example of a yoke incorporating the subject invention.

In the example shown in FIGS. 4-8, the stiffness ring 52 extends about a substantial portion of an outer periphery of the body 40. The stiffness ring 52 includes a curved outermost peripheral surface 78 (FIG. 7) at each of the first 48 and second 50 yoke arms, and includes truncated linear side surfaces 80 that extend between the first 48 and second 50 yoke arms. The body 40 also includes truncated side surfaces 82 (FIG. 6) for weight reduction purposes. Optionally, a stiffness ring 52' could extend about an entire periphery of a body 40' as shown in FIG. 9; however, truncating the sides offers the benefit of weight reduction without adversely affecting torque load distribution.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A yoke for a universal joint comprising:
a body rotatable about an axis and having a pair of arms extending outwardly from said body to an end face adapted to receive a cross member;
a hub portion extending out from said body in a direction opposite from said pair of arms, said hub portion including a splined bore configured to receive a driveshaft; and
an increased diameter portion extending radially outwardly from said body at least in regions of each of said arms such that said arms are located radially closer to said axis than an outer peripheral edge of said increased diameter portion, and wherein said hub portion, said pair of arms, and said increased diameter portion are integrally formed together with said body as a single-piece component.

2. The yoke according to claim 1 wherein said increased diameter portion extends substantially about an entire outer periphery of said body.

3. The yoke according to claim 1 wherein said body includes a generally flat area at each arm such that a base of each arm extends outwardly from a respective flat area to a distal end.

4. The yoke according to claim 3 wherein each arm is defined by a decreasing cross-sectional area from said base to said distal end.

5. The yoke according to claim 3 wherein said distal end comprises a substantially flat end face including at least a pair of fastening holes and with a recess positioned between said fastening holes to receive the cross member.

6. The yoke according to claim 5 wherein each arm is defined by a decreasing cross-sectional area from said base to said distal end.

7. The yoke according to claim 6 wherein said increased diameter portion is only formed at an outer peripheral edge of said body at each of said first and said second yoke arms.

8. The yoke according to claim 1 wherein said hub portion is defined by a first outer diameter and wherein said body is defined by a second outer diameter that is greater than said first outer diameter.

9. The yoke according to claim 8 wherein said increased diameter portion is defined by a third outer diameter that is greater than said second outer diameter.

10. The yoke according to claim 1 wherein said increased diameter portion is only formed at each of said arms and wherein said body includes substantially flat side faces between said arms.

11. A yoke for a universal joint comprising:
a body rotatable about an axis and having first and second opposing end faces;
a hub portion extending outwardly from said first opposing end face, said hub portion including a bore adapted to receive a driveshaft;
first and second yoke arms extending outwardly from said second opposing end face to distal ends adapted to receive a cross member; and
a stiffness ring extending radially outwardly from an outer periphery of said body at least in regions of each of said first and said yoke arms such that said first and said second yoke arms are located radially closer to said axis than an outer peripheral edge of said stiffness ring, and wherein said hub portion, said first and second yoke arms, and said stiffness ring are integrally formed together with said body as a single-piece component.

12. The yoke according to claim 11 wherein said stiffness ring extends about a substantial portion of said body.

13. The yoke according to claim 12 wherein said stiffness ring includes a curved outermost peripheral surface at each of said first and said second yoke arms, and includes truncated linear side surfaces that extend between said first and said second yoke arms.

14. The yoke according to claim 12 wherein said stiffness ring extends about an entire periphery of said body.

15. The yoke according to claim 11 wherein said bore comprises a splined bore that mates with a splined surface on said driveshaft.

16. The yoke according to claim 15 wherein said body includes a generally flat area at each arm such that a base of each arm extends outwardly from a respective flat area to said distal end, and wherein each arm is defined by a decreasing cross-sectional area from said base to said distal end.

17. The yoke according to claim 16 wherein said distal end comprises a substantially flat end face including at least a pair of fastening holes and with a recess positioned between said fastening holes to receive the cross member.

18. A driveshaft assembly comprising:
a driveshaft rotatable about an axis and receiving a driving input from a vehicle power source;
a yoke including
  a hub portion with a bore that receives one end of said driveshaft,
  a body having the hub portion extending outwardly from one side and first and second yoke arms extending outwardly from an opposite side, wherein said opposite side includes a substantially flat area at a base of each of said first and said second yoke arms, and
  an increased diameter portion extending radially outwardly from said body at least in regions of each of said first and said second arms such that said first and said second arms are located radially closer to said axis than an outer peripheral edge of said increased diameter portion, and wherein said hub portion, said first and second yoke arms, and said increased diameter portion are integrally formed together with said body as a single-piece component; and
a cross member attached to said first and second yoke arms.

19. The driveshaft assembly according to claim 18 wherein said hub portion is defined by a first outer diameter, said body is defined by a second outer diameter that is greater than said first outer diameter, and said increased diameter portion is defined by a third outer diameter that is greater than said second outer diameter.

20. The driveshaft assembly according to claim 19 wherein said increased diameter portion is only formed at an outer peripheral edge of said body at each of said first and said second yoke arms.

21. The driveshaft assembly according to claim 19 wherein said increased diameter portion extends substantially about an entire outer periphery of said body.

22. The driveshaft assembly according to claim 18 wherein said bore comprises a splined bore that mates with a splined surface on said driveshaft.

23. The driveshaft assembly according to claim 22 wherein said base of each arm extends outwardly from said flat area to a distal end, and wherein each arm is defined by a decreasing cross-sectional area from said base to said distal end.

24. The driveshaft assembly according to claim 23 wherein said distal end comprises a substantially flat end face including at least a pair of fastening holes and with a recess positioned between said fastening holes to receive the cross member.

* * * * *